(12) United States Patent
Rogers

(10) Patent No.: US 7,247,368 B1
(45) Date of Patent: Jul. 24, 2007

(54) STEALTH FOAM AND PRODUCTION METHOD

(75) Inventor: Darren Kenneth Rogers, Wheeling, WV (US)

(73) Assignee: Touchstone Research Laboratory, Ltd., Triadelphia, WV (US)

( * ) Notice: Subject to any disclaimer, the term of this patent is extended or adjusted under 35 U.S.C. 154(b) by 177 days.

(21) Appl. No.: 09/976,426

(22) Filed: Oct. 12, 2001

(51) Int. Cl.
*B32B 3/26* (2006.01)
*C10C 5/00* (2006.01)

(52) U.S. Cl. ............... 428/304.4; 252/502; 252/510; 252/511; 250/515.1; 44/607; 44/620

(58) Field of Classification Search .......... 428/306.4, 428/307.3, 312.2; 44/620; 423/445 R, 448
See application file for complete search history.

(56) References Cited

U.S. PATENT DOCUMENTS

| | | | | |
|---|---|---|---|---|
| 4,999,385 A | * | 3/1991 | McCullough et al. | ....... 521/149 |
| 5,312,678 A | * | 5/1994 | McCullough et al. | ....... 442/189 |
| 5,525,988 A | * | 6/1996 | Perkins et al. | .................. 342/4 |
| 5,888,469 A | * | 3/1999 | Stiller et al. | ............ 423/445 R |
| 6,656,238 B1 | * | 12/2003 | Rogers et al. | ................ 44/620 |
| 6,656,239 B1 | * | 12/2003 | Rogers et al. | ................ 44/620 |
| 6,673,328 B1 | * | 1/2004 | Klett et al. | ............. 423/445 R |
| 7,192,537 B2 | * | 3/2007 | Lucas | ........................ 252/502 |

OTHER PUBLICATIONS

Translation of JP 09-087057, Satoshi Nakano, "Porous Carbonaceous Substrate", Mar. 31, 1997.*

* cited by examiner

*Primary Examiner*—Hai Vo
(74) *Attorney, Agent, or Firm*—Philip D. Lane

(57) ABSTRACT

Carbon foams exhibiting a dielectric constant of from about 2 to about 6 and simultaneously an electrical resistivity in the range of between about $1.E^{+00}$ ohm-cm and about $1.E^{+06}$ ohm-cm, demonstrate excellent radar emission absorptivity in the megahertz and gigahertz ranges.

16 Claims, 2 Drawing Sheets

STEALTH FOAM AND PRODUCTION METHOD

This invention was made with Government support under N0014-00-C-0062 awarded by the Office of Naval Research. The Government has certain rights in the invention.

FIELD OF THE INVENTION

The present invention relates to carbon foams and more particularly to carbon foams that exhibit "stealth" or radar absorptive characteristics.

BACKGROUND OF THE INVENTION

The search for materials that are relatively easily adaptable to coating and structural application in naval and aircraft construction is well known and long standing. Such materials are conventionally used to eliminate or at least significantly reduce the "radar signature" of such military vehicles to enemy radar. The literature abounds with proposals for such materials and the available texts (for example "Introduction to Radar", Skolnik, McGraw-Hill Book, Co. (1980) pp. 26, 31, 33, 63-63, etc.) list thousands of references to methods and materials for absorbing radar signals for purposes of reducing the detectability of military ships and aircraft. Since it is highly likely that the most refined techniques for making military targets "stealthy" have not been made public, no extended discussion of such materials and techniques is can be presented herein. Suffice it to say that the search for more effective such materials and techniques continues unabated and that the development of such materials continues to be of military significance.

OBJECT OF THE INVENTION

It is therefore an object of the present invention to provide a low-cost and relatively easily manufactured and fabricated material that exhibits "stealth" properties by acting as an absorber of radar radiation.

SUMMARY OF THE INVENTION

According to the present invention, there is provided a radar emission absorbing material comprising a carbon based foam exhibiting a low dielectric constant, in the range of from about 2 to about 6, and a high reactance/electrical resistivity component, i.e. a large phase angle and significant reactance component versus resistance component of impedance in the megahertz and gigahertz frequency ranges.

DETAILED DESCRIPTION

Figure 2:
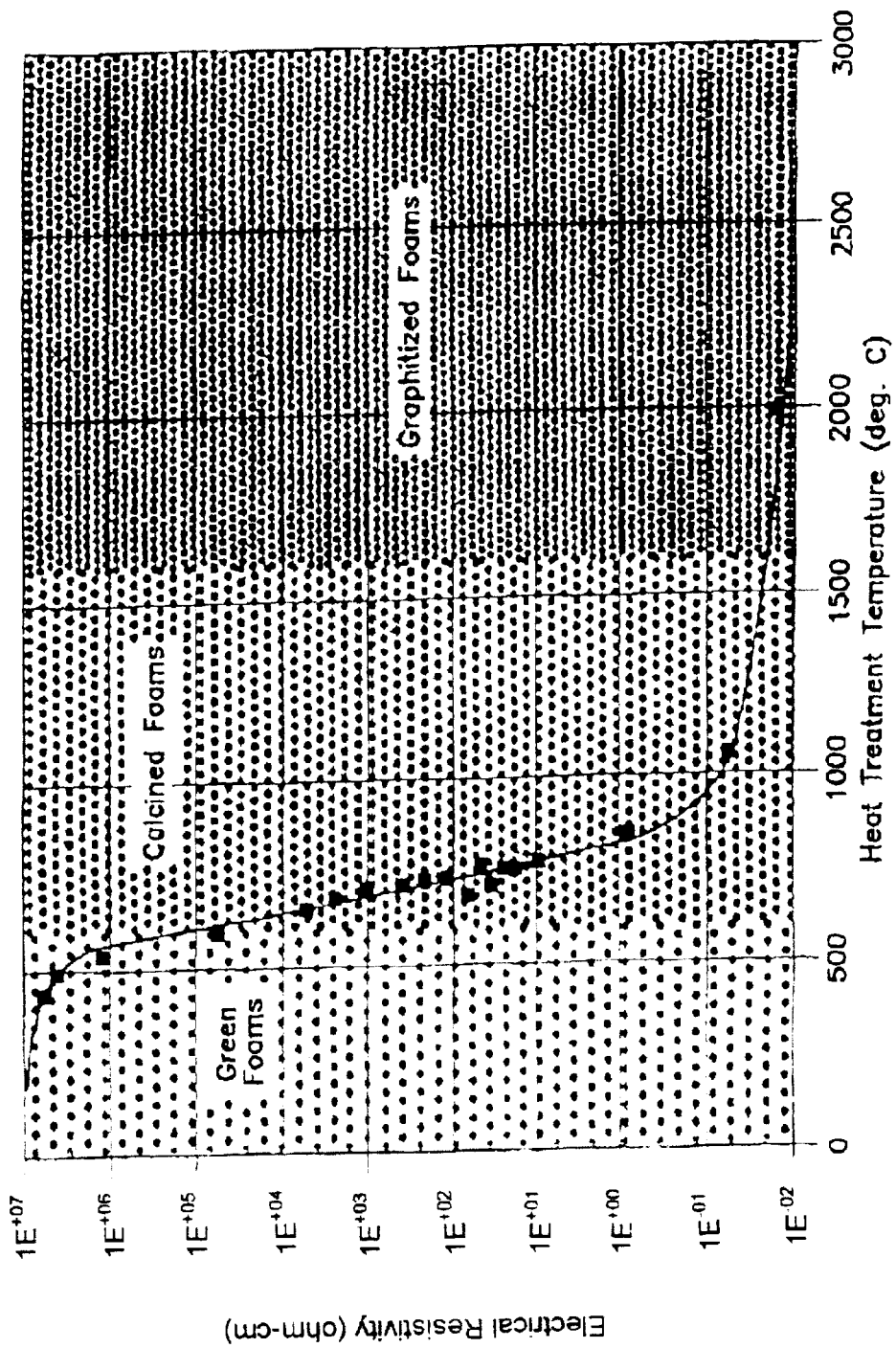
FIG. 2 is a graph of electrical resistivity versus heat treatment temperature for carbon foams produced in accordance with the present invention.

U.S. patent application Ser. No. 09/453,729 filed Dec. 2, 1999, now abandoned, and entitled, "Coal-Based Carbon Foams", which is incorporated herein by reference in its entirety, describes a family of carbon foams having a density of preferably between about 0.1 g/cm$^3$ and about 0.8 g/cm$^3$ that are produced by the controlled heating of coal particulate preferably up to ¼ inch in diameter in a "mold" and under a non-oxidizing atmosphere. The process described in this application comprises: 1) heating a coal particulate of preferably small i.e., less than about ¼ inch particle size in a "mold" and under a non-oxidizing atmosphere at a heat uprate from about 1 to about 20° C. to a temperature of between about 300 and about 700° C.; 2) soaking at a temperature of between about 300 and 700° C. for from about 10 minutes up to about 12 hours to form a green foam; 3) controllably cooling the green foam to a temperature below about 100° C. According to the method described in the aforementioned application, the porous foam product of this process is subsequently preferably carbonized by the application of known techniques, for example, soaking at a temperature of between about 800° C. and about 1200° C. for a period of from about 1 to about 3 hours. Although this is the preferred temperature range for carbonization, carbonization actually occurs at temperatures between about 600° C. and 1600° C. The electrical resistivity of carbon foams of the present application produced within the temperature ranges for the various treatments of the materials described in the aforementioned patent application are shown graphically in FIG. 2. As shown in this graph, so-called "green foam" i.e. foam produced by heating and soaking at temperatures below about 600° C., exhibit an electrical resistivity on the order of about $1.E+^{07}$ ohm-cm, while foam subjected to carbonization, i.e. exposure to temperatures on the order of 600° C. to about 1600° C. exhibit dielectric constants on the order of from about $1.E+^{06}$ ohm-cm to about $1.E^{-02}$ ohm-cm.

Figure 1:
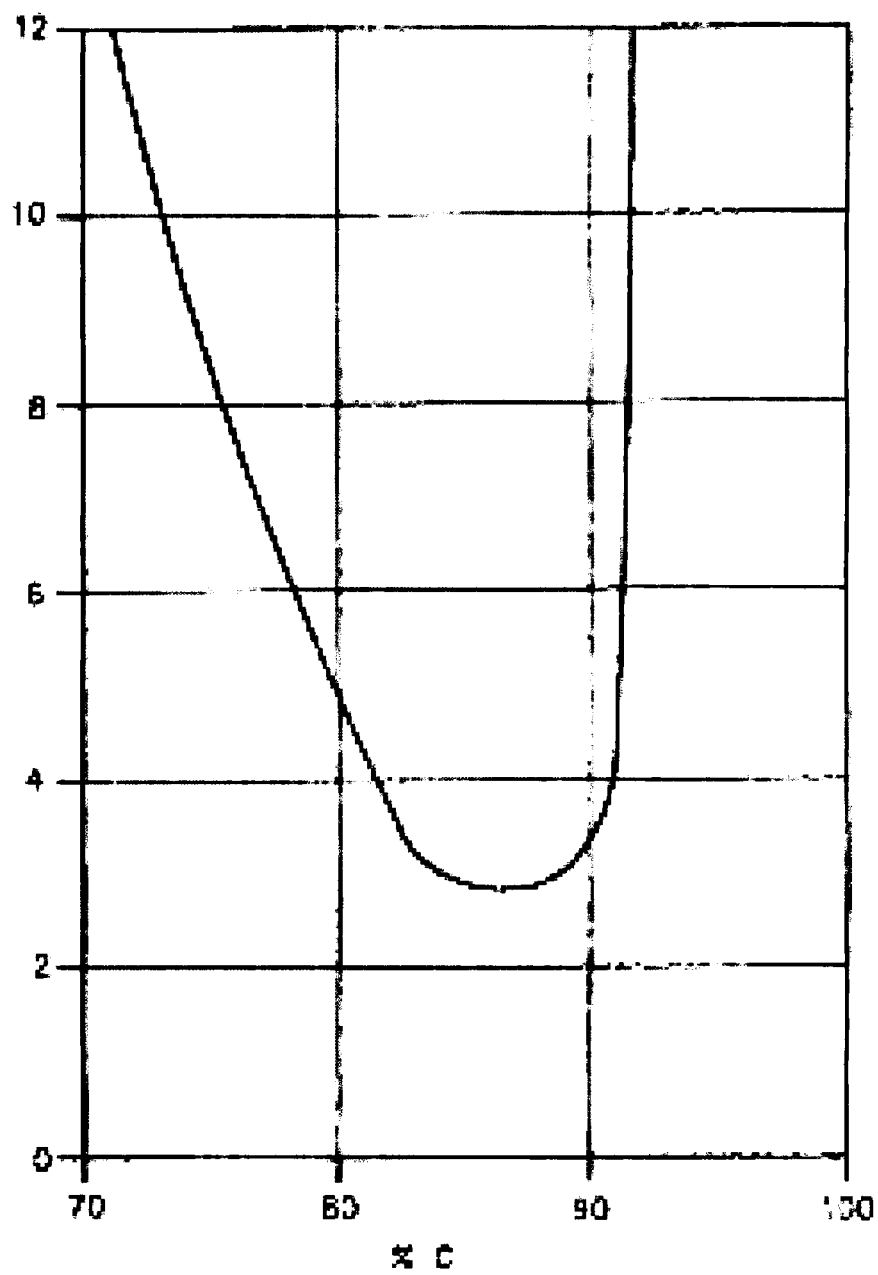
FIG. 1 is a graph of dielectric constant versus weight percent carbon content for carbon foams according to the present invention.

Concurrently, it has been observed in the study of the foam production process, that the foam material undergoes a significant change in dielectric constant or reactance as it is commonly referred to in the radar signature control arts as the processing proceeds. Such change is plotted in FIG. 1 as dielectric constant versus weight percent carbon. As shown in this Figure, the dielectric constant undergoes a generally parabolic shift during processing, removal of volatile components, with a minimum being reached at from about 2 to about 6 when the weight percent carbon content of the foam is between about 75 and about 95 weight percent. It is hypothesized, without any intent to limit the scope of the present invention, that as processing proceeds, i.e. the temperature of treatment increases, various molecules and atoms are removed from the carbon structure resulting in a more condensed structure whose dielectric constant achieves a minimum of about 2 and then through further condensation begins to rise again.

According to the present invention, carbon foams exhibiting a dielectric constant of from about 2 to about 6 and simultaneously an electrical resistivity in the range of between about $1.E^{+00}$ ohm-cm and about $1.E^{+06}$ ohm-cm, demonstrate excellent radar emission absorptivity in the megahertz and gigahertz ranges.

The production of carbon foams of this type is controlled by restriction of the temperature of the carbonizing step to a relatively narrow range of from about 600° C. to about 800° C. and preferably from about 600° C. and about 700° C. Attainment of the desired combination of dielectric constant (reactance) and resistivity is achieved after soaking at these temperatures for only a matter of minutes, preferably from about 2 to about 30 minutes and most preferably between about 5 and about 20 minutes under an inert gas.

According to a preferred embodiment of the present invention, the radar absorbing preformed, low density, i.e., from about 0.1 to about 0.8 g/cm$^3$, and preferably from about 0.1 to about 0.6 g/cm³, cellular product or foam of the present invention is produced from powdered coal particulate preferably less than about ¼ inch in diameter by the controlled heating of the powdered coal in a "mold" under a non-oxidizing atmosphere. The starting material coal may include bitumen, anthracite, or even lignite, or blends of these coals that exhibit a "free swell index" as determined by ASTM D720 of between about 3.5 and about 5.0, but are preferably bituminous, agglomerating coals that have been comminuted to an appropriate particle size, preferably to a fine powder below about −60 to −80 mesh.

The radar absorbing carbon foams described herein are semi-crystalline or more accurately turbostratically-ordered and largely isotropic i.e., demonstrating physical properties that are approximately equal in all directions. These materials typically exhibit pore sizes on the order of less than 300µ, although pore sizes of up to 500µ are possible within the operating parameters of the process described. It is critical to the successful practice of the present invention that the coal starting material exhibit the previously specified free swell index of between about 3.5 and about 5.0 and preferably between about 3.75 and about 4.5. Selection of starting materials within these parameters was determined by evaluating a large number of coals characterized as ranging from high to low volatiles. In general, it has been found that bituminous coals exhibiting free swell indexes within the previously specified ranges provided the best foam products in the form of the lowest foam densities and the highest foam specific strengths (compressive strength/density). Coals having free swell indices below these preferred ranges may not agglomerate properly leaving a powder mass or sinter, but not swell or foam, while coals exhibiting free swell indices above these preferred ranges may heave upon foaming and collapse upon themselves leaving a dense compact.

The method of producing the radar absorbing carbon foams of the present invention comprises initially: 1) heating a coal particulate of preferably small, i.e. less than about ¼ inch particle size, in a "mold" and under a non-oxidizing atmosphere at a heat up rate of from about 1 to about 20° C. to a temperature of between about 300 and about 600° C.; 2) soaking at a temperature of between about 300 and 600° C. for from about 10 minutes up to about 12 hours to form a "green foam"; and 3) controllably cooling the "green foam" to a temperature below about 100° C. The non-oxidizing atmosphere may be provided by the introduction of inert or non-oxidizing gas into the "mold" at a pressure of from about 0 psi, i.e., free flowing gas, up to about 500 psi. The inert gas used may be any of the commonly used inert or non-oxidizing gases such as nitrogen, helium, argon, $CO_2$, etc.

It is generally not desirable that the reaction chamber be vented or leak during this heating and soaking operation. The pressure of the chamber and the increasing volatile content therein tends to retard further volatilization while the cellular product sinters at the indicated elevated temperatures. If the furnace chamber is vented or leaks during soaking, an insufficient amount of volatile matter may be present to permit inter-particle sintering of the coal particles thus resulting in the formation of a sintered powder as opposed to the desired cellular product. Thus, according to a preferred embodiment of the present process, venting or leakage of non-oxidizing gas and generated volatiles is inhibited consistent with the production of an acceptable cellular product.

Additional more conventional blowing agents may be added to the particulate prior to expansion to enhance or otherwise modify the pore-forming operation.

The term "mold", as used herein is meant to define any mechanism for providing controlled dimensional forming of the expanding coal or carbon or containing the foaming operation. Thus, any chamber into which the coal particulate or other carbon precursor is deposited prior to or during heating and which, upon the foam precursor attaining the appropriate expansion temperature, contains the expanding carbon to some predetermined configuration such as: a flat sheet; a curved sheet; a shaped object; a building block; a rod; tube or any other desired solid shape can be considered a "mold" for purposes of the instant invention. The term "mold" as used herein, is meant to include any container, even an open topped container that "contains" the expanding mixture so long as such a device is contained in a pressurizable vessel that will permit controlled foaming. Clearly, a container that results in the production of some particular near net or net shape is particularly preferred.

As will be apparent to the skilled artisan familiar with pressurized gas release reactions, as the pressure in the reaction vessel, in this case the mold increases, from 0 psi to 500 psi, as imposed by the non-oxidizing gas, the reaction time will increase and the density of the produced porous coal will increase as the size of the "bubbles" or pores produced in the expanded carbon decreases. Similarly, a low soak temperature at, for example about 400° C. will result in a larger pore or bubble size and consequently a less dense expanded coal than would be achieved with a soak temperature of about 600° C. Further, the heat-up rate will also affect pore size, a faster heat-up rate resulting in a smaller pore size and consequently a denser expanded coal product than a slow heat-up rate. These phenomenon are, of course, due to the kinetics of the volatile release reactions which are affected, as just described, by the ambient pressure and temperature and the rate at which that temperature is achieved. These process variables can be used to custom produce the expanded coals of the present invention in a wide variety of controlled densities, strengths etc.

Cooling of the "green foam" after soaking is not particularly critical except as it may result in cracking of thereof as the result of the development of undesirable thermal stresses. Cooling rates less than 10° C./min to a temperature of about 100° C. are typically used to prevent cracking due to thermal shock. Somewhat higher, but carefully controlled, cooling rates may however, be used to obtain a "sealed skin" on the open cell structure of the product as described below. The rate of cooling below 100° C. is in no way critical.

After expanding the carbon material as just described, the "green foam" is an open celled material. Several techniques have been developed for "sealing" the surface of the open celled structure to improve its adhesive capabilities for further fabrication and assembly of a number of parts. For example, a layer of a commercially available graphitic adhesive (for example an epoxy-graphite adhesive) can be coated onto the surface and cured at elevated temperature or allowed to cure at room temperature to provide an adherent skin. Alternatively, the expansion operation can be modified by cooling the "green foam" rapidly, e.g., at a rate of 10° C./min or faster after expansion. It has been discovered that this process modification results in the formation of a more dense skin on the "green foam" which presents a closed pore surface to the outside of thereof. At these cooling rates, care must be exercised to avoid cracking.

After expanding, the "green foam" is readily machineable, sawable and otherwise readily fabricated using conventional fabrication techniques.

According to the method of the present invention, subsequent to the production of the "green foam" as just described, the "green foam" is subjected to carbonization and graphitization within the controlled conditions described below to obtain the radar absorbing foam of the present invention.

A variety of additives and structural reinforcers may be added to the carbon materials of the present invention either before or after expansion to enhance specific mechanical properties such as fracture strain, fracture toughness and impact resistance. For example, particles, whiskers, fibers, plates, etc. of appropriate carbonaceous or ceramic composition can be incorporated into the radar emission absorbing foam to enhance its mechanical properties.

The radar absorbing foams of the present invention can additionally be impregnated with; for example, petroleum pitch, epoxy resins or other polymers using a vacuum assisted resin transfer type of process. The incorporation of such additives provides load transfer advantages similar to those demonstrated in carbon composite materials. In effect a 3-D composite is produced that demonstrates enhanced impact resistance and load transfer properties.

The cooling step in the expansion process results in some relatively minimal shrinkage on the order of less than about 5% and generally in the range of from about 2% to about 3%. This shrinkage must be accounted for in the production of near net shape or final products of specific dimensions and is readily determinable through trial and error with the particular carbon starting material being used. The shrinkage may be further minimized by the addition of some inert solid material such as coke particles, ceramic particles, ground waste from the coal expansion process etc. as is common practice in ceramic fabrication.

Carbonization, sometimes referred to as calcining, is conventionally performed by heating the "green foam" under an appropriate inert gas at a preferred heat-up rate of less than about 5° C. per minute to a temperature of between about 600° C. and about 1600° C. and soaking for from about 2 minutes to about 30 minutes and preferably from about 10 to about 20 minutes under an inert atmosphere. Appropriate inert gases suitable for this atmosphere include those described above that are tolerant of these high temperatures. The inert atmosphere is supplied at a pressure of from about 0 psi up to a few atmospheres. The carbonization process serves to remove non-carbon elements present in the green foam" such as sulfur, oxygen, hydrogen, etc, i.e. to condense the "green foam" until the desired dielectric constant and electrical resistivity have been attained.

As already alluded to, the radar emission absorbing foams of the present invention can be produced in any solid geometric shape. Such production is possible using any number of modified conventional processing techniques such as extrusion, injection molding, etc. In each of such instances, the process must, of course, be modified to accommodate the processing characteristics of the starting material. For example, in accordance with a preferred embodiment of the present invention, in extruding such products, the coal powder starting material is fed by an auger into an expansion chamber where it is expanded and from which it is extruded while still viscous. Upon exiting the extrusion die, the material is cooled to provide a solid shape of the desired and precalculated dimensions. To improve the efficiency, i.e., cycle time of the process, the input material can be preheated to a temperature below the expansion point, e.g., below about 300° C., fed into the auger chamber where additional heat is imparted to the powder with final heating being achieved just before extrusion of the "green foam" through the die.

Similar relatively minor process modifications can be envisioned to fabricate the radar emission absorbing foams of the present invention in injection molding, casting and other similar conventional material fabrication processes.

While the radar emission absorbing materials of the present invention have been described herein primarily in the context of coal-based foams produced by the foaming of a coal particulate, similar carbon based foams derived from coal tar pitch, petroleum pitch, synthetic pitch and even carbon foams produced by the carbonization of polymeric materials such as polyacrylonitrile (PAN) and mixtures or combinations of all or some of these will provide similar desirable properties when appropriately carbonized under controlled conditions of the type described above to produce the desired dielectric constants and electrical resistivities.

As the invention has been described, it will be apparent to those skilled in the art that the same may be varied in many ways without departing from the spirit and scope of the invention. Any and all such modifications are intended to be included within the scope of the appended claims.

What is claimed is:

1. A material comprising a carbon foam manufactured by a process comprising the steps of:

heating particulate coal in a pressurized non-oxidizing atmosphere having a pressure in the range of about 50 psi to about 500 psi, to a temperature in the range about 300° C. to about 600° to form a green foam; and carbonizing said green foam to form a carbonized foam by heating said green foam to a maximum temperature ranging from about 600° C. to about 800° C., and soaking at this temperature for about 2 to about 30 minutes to produce a carbonized foam which exhibits a dielectric constant in the range of about 2 to about 6 and an electrical resistivity in the range of about $1.E^{+00}$ ohm-cm to about $1.E^{+06}$ ohm-cm.

2. The material of claim 1, wherein said particulate coal exhibits a free swell index of between about 3.75 and about 4.5.

3. The material of claim 1, wherein said particulate coal exhibits a free swell index in the range of about 3.5 to about 5.

4. The material of claim 1, wherein said maximum temperature ranges from about 600° C. to about 700° C.

5. The material of claim 1, wherein said soaking ranges from about 5 minutes to about 20 minutes.

6. The material of claim 1, wherein said carbonized foam has a density ranging from about 0.1 g/cc to about 0.8 g/cc.

7. The material of claim 1, wherein said carbonized foam has a density ranging from about 0.1 g/cc to about 0.6 g/cc.

8. A radar emissions absorbing body comprising:

a carbon foam on a surface of a body, wherein said carbon foam has the properties of a dielectric constant in the range of about 2 to about 6 and an electrical resistivity in the range of about 15 ohm-cm to about $1.E+^{06}$ ohm-cm.

9. The radar emissions absorbing body of claim 8, wherein said carbon foam has a density ranging from about 0.1 g/cc to about 0.8 g/cc.

10. The radar emissions absorbing body of claim 8, wherein said carbon foam has a density ranging from about 0.1 g/cc to about 0.6 g/cc.

11. A material comprising a carbon foam having a dielectric constant from about 2 to about 6 and an electrical resistivity from about 15 ohm-cm to about $1.E^{+06}$ ohm-cm.

12. The material of claim 11, wherein said carbon foam is prepared from at least one selected from the group consisting of: particulate coal, coal tar pitch, petroleum pitch and carbonized polymeric materials.

13. The material of claim 11, wherein said carbon foam is a coal-based carbon foam.

14. The material of claim 13, wherein said carbon foam is derived from particulate coal exhibiting a free swell index from about 3.5 to about 5.0.

15. The material of claim 11, wherein said coal-based carbon foam is a porous coal-based product having a density ranging from about 0.1 g/cm$^3$ to about 0.8 g/cm$^3$.

16. The material of claim 11, wherein said carbon foam has a density ranging from about 0.1 g/cc to about 0.6 g/cc.

\* \* \* \* \*